United States Patent

[11] 3,591,775

[72] Inventor Donald P. Schulze
La Mirada, Calif.
[21] Appl. No. 735,262
[22] Filed June 7, 1968
[45] Patented July 6, 1971
[73] Assignee C. P. Clare & Company
Chicago, Ill.

[54] SHIFT REGISTER USING SEALED REED SWITCHES
10 Claims, 2 Drawing Figs.

[52] U.S. Cl. .......... 235/92, 317/140
[51] Int. Cl. .......... H03k 27/00
[50] Field of Search .......... 317/140; 340/168 S, 168 R; 235/92

[56] References Cited
UNITED STATES PATENTS
2,168,198 8/1939 Frink .......... 235/92
2,914,749 11/1959 Vandesande et al. .......... 340/168

*Primary Examiner*—Daryl W. Cook
*Assistant Examiner*—Joseph M. Thesz, Jr.
*Attorney*—Mason, Kolehmainen, Rathburn and Wyss

ABSTRACT: A plural stage shift register uses a reed relay including a pair of windings and one or more sealed reed switches in each stage. The contacts formed by the reed switches of each stage are operated by concurrent energization of the windings and held operated by the energization of one winding. One winding in each stage is provided with a holding potential. A transfer capacitor in each stage is charged through the contacts of the next lowest stage and is discharged through one of the windings in the same stage to obtain concurrent energization of two windings. By sequencing the removal of the holding potential and the discharge of the capacitors, bits stored in the register are shifted from the lowest stage of the highest stage.

PATENTED JUL 6 1971 3,591,775

Figure 1:
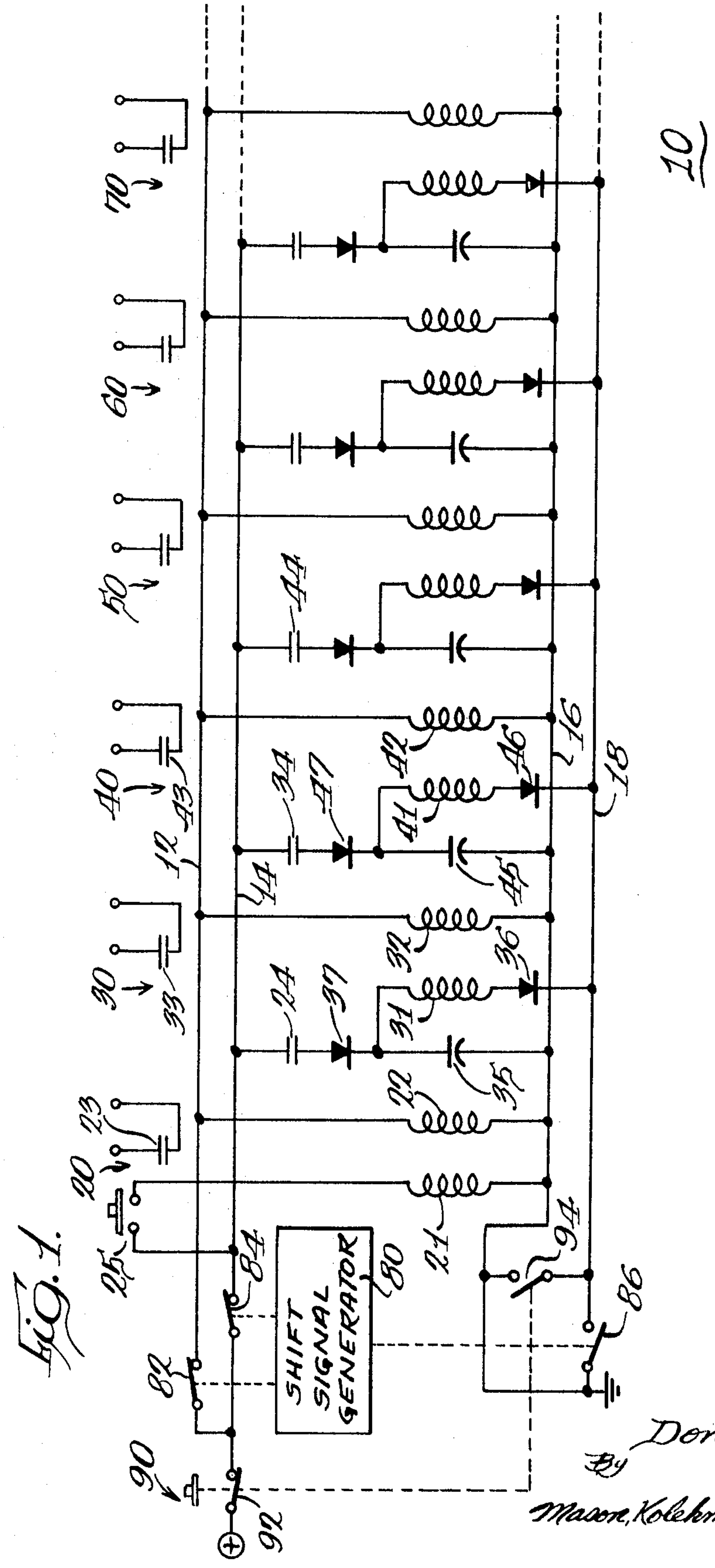

Inventor:
Donald P. Schulze
By Mason, Kolehmainen, Rathburn & Wyss
Attys

SHIFT REGISTER USING SEALED REED SWITCHES

This invention relates to a shift register and, more particularly, to a shift register using dual winding relays.

The advantages of sealed magnetic switches in applications in which adverse environmental operating conditions are likely to be encountered or in which long life or improved output isolation is desired have led to the use of magnetic reed switches in various basic data handling circuits such as a shift register. As an example, U.S. Pat. No. 3,042,900 and No. 3,327,178 disclose shift registers using sealed magnetic reed switches. These circuits, while providing satisfactory performance, require somewhat larger numbers of components than desired with the attendant increase in the physical size of the circuit and its cost.

Accordingly, an object of the present invention is to provide a new and improved shift register using magnetic switches.

Another object is to provide a relay-type shift register using a reduced number of components.

A further object is to provide a shift register using plural winding relays, both of which are used to shift data and only one of which is used to store or hold data.

A further object is to provide a shift register using sealed magnetic switches in which the capacitive transfer of energy to one of a pair of windings required to operate the switch is used to shift data along the register.

In accordance with these and many other objects, an embodiment of the invention comprises a plural stage shift register in which each stage of the register includes one or a group of sealed magnetic reed switches provided with a common pair of windings. The relay construction is such that both of the windings must be concurrently energized to operate the contacts, and only a single one of the windings need be energized to maintain previously operated contacts in an operated state. The relays forming the stages of the shift register are arranged in a sequence from lowest to highest, and each of the register stages includes a transfer or storage capacitor which is selectively charged or not charged from a potential source over a circuit including the contacts of the relay forming the next lowest stage in the sequence. Each storage or transfer capacitor is adapted to be discharged through one of the windings of the relay in the same stage concurrently with the energization of the other winding of the relay in the stage to cause the operation of the corresponding contacts. Thus, by periodically removing the potential from the holding winding of the relay in each stage so as to release all of the relays in the shift register and thereafter returning the holding potential concurrently with providing a discharge path for the storage capacitors, the bits stored in the register are progressively shifted from the lowest toward the highest stage of the shift register.

Figure 2:
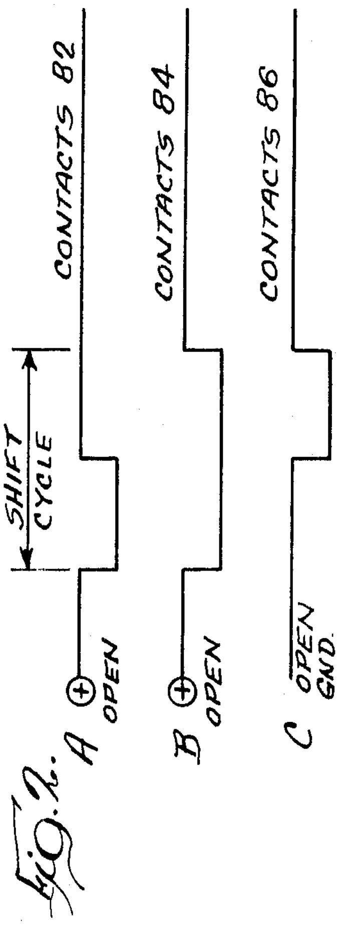

Many other objects and embodiments of the present invention will become apparent from considering the following detailed description in conjunction with the drawings in which:

FIG. 1 is a schematic circuit diagram of a shift register embodying the present invention; and FIG. 2 is an illustration of the waveforms of certain control signals used in the shift register shown in FIG. 1.

Referring now more specifically to FIG. 1 of the drawings, therein is illustrated a shift register which is indicated generally as 10 and which embodies the present invention. The shift register 10 includes an input stage 20 for entering bits of a data entry or item in the register 10 to be shifted into successive stages 30, 40, 50, 60, and 70 arranged in a sequence from lowest to highest, respectively. The shifting of the data bits through the register 10 is controlled by a shift signal generator 80.

Each of the stages 30, 40, 50, 60, and 70 includes a relay or switching assembly formed by a pair of windings for controlling the operation of one or more pairs of contacts provided by one or more sealed magnetic reed switches. In the stage 30, for instance, the relay includes a pair of windings 31 and 32 and a pair of normally open contacts 33 and 34. When both of the windings 31 and 32 are energized, the resultant flux field produced by the addition of the fields of these windings closes both of the contacts 33 and 34. Alternatively, if only one of the windings 31 and 32 is energized, the contacts 33 and 34 remain in their normally open state and are not closed. However, if the contacts 33 and 34 are in a closed condition, the energization of either one of the windings 31 or 32 provides a sufficient flux field to maintain the contacts 33 and 34 in a closed condition. The relays in the stages 40, 50, 60, and 70 are similar to the relays included in the stage 30. As an example, the stage 40 includes a relay including two windings 41 and 42, and two pairs of normally open contacts 43 and 44.

The relays in the stages 30, 40, 50, 60, and 70 are connected in identical manner. As an example, the holding winding 42 in the stage 40 is connected directly between a common reference potential or ground conductor 16 and a common holding conductor 12 normally supplied with a positive potential through two pairs of normally closed contacts 82 and 92. The other winding 41 is connected between one terminal of a storage or transfer capacitor 45 in the stage 40 and a common transfer conductor 18 through a diode 46. The storage or transfer capacitor 45 is connected in series between the ground conductor 16 and a common charging conductor 14 that is normally supplied with positive potential through the closed contacts 92 and an additional pair of closed contacts 84 over a circuit including a diode 47 and the normally open contacts 34 of the relay in the next lowest stage 30 in the shift register sequence. The remaining stages are similarly connected except that in the lowest shift register stage 30, the circuit for charging the storage capacitor 35 is controlled by the input stage 20.

More specifically, the data input stage or unit 20 includes a relay of the type included in the stages 30, 40, 50, 60, and 70 of the register 10 and comprises a pair of windings 21 and 22, both of which are energized to close two pairs of normally open contacts 23 and 24 and one of which, the winding 22, is capable of maintaining the contacts 23 and 24 in a closed condition when they have previously been closed by the concurrent energization of the two windings 21 and 22. The winding 22 is directly connected between the holding conductor 12 and the reference potential point or conductor 16. The winding 21 is connected between the conductor 16 and the charging conductor 14 through a switch 25 forming a pair of normally open contacts.

To illustrate the operation of the shift register 10, this register is cleared to the condition illustrated in FIG. 1 in which the conductor 18 is floating and a positive potential is applied to the conductors 12 and 14. Thus, all of the holding windings, such as the windings 22, 32, and 42, are energized to produce half of the flux field required to operate the associated contacts in the input stage 20 and in the shift register stages 30, 40, 50, 60, and 70. To enter a "1" bit into the register 10, the contacts 25 are momentarily closed to energize the winding 21 in the entry stage or input stage 20. The concurrent energization of the two windings 21 and 22 closes the contacts 23 and 24. The contacts 23 can be connected to a suitable indicating or output device to provide an indication that a bit is being entered into the input stage 20. The closure of the contacts 24 completes a circuit for charging the storage capacitor 35 in the first shift register stage 30 over a circuit including the diode 37. Accordingly, the capacitor 35 in the first shift register stage 30 is charged to a positive potential representing the entry of a bit. Even though the contacts 25 are only momentarily closed so that the winding 21 is only momentarily energized concurrently with the energization of the winding 22, the termination of the energization of the winding 21 does not release the contacts 23 and 24 because of the half flux field produced by the continuing energization of the winding 22 is sufficient to maintain the contacts 23 and 24 closed.

To shift the first entered bit from the input stage 20 into the first shift register stage 30, the shift signal generator 80 is used. This shift register generator can be of any suitable construction using relays or controlled conduction devices, such as transistors, and is illustrated in the drawings as comprising means for selectively opening and closing the contacts 82 and 84, which are normally closed, and a pair of normally open contacts 86 so as to simplify the illustration of the invention. When it is desired to shift the input data bit from the stage 20 into the register 10, a start signal is supplied to the shift signal generator 80, as by closing a switch or otherwise supplying an enabling potential, to operate the generator 80 through a single shift cycle.

At the beginning of the shift cycle, the generator 80 opens the contacts 82 (see waveform A in FIG. 2) to remove the positive potential from the holding conductor 12. This causes the release of all of the relays in the circuit 10 by terminating the energization of all of the holding windings. Thus, the winding 22 is no longer energized, and the contacts 23 and 24 are opened. Concurrently therewith, the generator 80 opens the contacts 84 (see waveform B in FIG. 2) to remove the positive potential from the charging conductor 14. The contacts 82 remain opened long enough to insure the release of all of the relays, and in one shift register 10 constructed in accordance with the present invention, the open period of the contacts 82 is around 4 milliseconds. At the expiration of this period, the contacts 82 are again closed to again energize all of the holding windings in the register such as the windings 22, 32, and 42. However, since all of the relays in the shift register 10 have previously been released, the return to an energized state of the holding windings is not effective to reoperate any of the relays. The contacts 84 remain open (compare waveforms A and B in FIG. 2).

When the contacts 82 are reclosed, the contacts 86 are closed (see waveform C in FIG. 2) to apply ground to the conductor 18 or to interconnect the common conductors 16 and 18. The connection of the conductors 16 and 18 to a point of common reference potential initiates the transfer of a data bit from a given stage to the next highest stage. More specifically, since only the capacitor 35 is in a charged state, the closure of the contacts 86 completes a discharging circuit for the capacitor 35 extending through the winding 31, the diode 36, the conductor 18, the switch 86, and the conductor 16. The discharge of the capacitor 35 through the winding 31 energizes this winding concurrently with the energization of the winding 32 through the closed contacts 82 so that the contacts 33 and 34 controlled by these windings are closed.

The closure of the contacts 33 provides an output indication representing the storage of a "1" bit in the first shift register stage 30. The closure of the contacts 34 prepares a circuit for charging the capacitor 45 in the next highest shift register stage 40. When the capacitor 35 has been completely discharged, thus terminating the flow of current through the winding 31, the contacts 33 and 34 are not released because of the half flux field generated by the continuing energization of the winding 32.

At the end of the shift cycle, which is 8 milliseconds in one constructed embodiment of the register 10, the shift signal generator 80 closes the contacts 84 and opens the contacts 86 (see waveforms B and C in FIG. 2). The opening of the contacts 86 interrupts the discharge path for the transfer or storage capacitors in the shift register circuit 10, and the closure of the contacts 84 initiates the charging of the storage capacitors in those stages of the register 10 in which a bit is to be stored. Thus, the closure of the contacts 84 completes a circuit for charging the capacitor 45 in the second shift register stage 40, the circuit including the closed contacts 34 and the diode 47. At the end of the first shift cycle, all of the output contacts are open except for the contacts 33 which are closed to represent the storage of a bit in the first shift register stage 30. Further, the contacts 34 are closed so that the capacitor 45 in the next highest stage 40 is charged to indicate that during the next shift cycle, a bit is to be transferred into the second stage 40.

Assuming that the data entry includes a "0" bit in the second position, another start signal is supplied to the shift signal generator 80 without operating the input stage 20. The shift signal generator 80 then generates the series of waveforms shown in FIG. 2 during which all of the relays in the register 10 are released to open the contacts 33 and 34 and following which the capacitor 45 is discharged through the winding 41 to cause the closure of the contacts 43 and 44. The closure of the contacts 43 indicates the storage of a bit in the second shift register stage 40, and the closure of the contacts 44 prepares a circuit for charging the transfer or storage capacitor in the next highest stage 50, this capacitor being charged at the end of the shift cycle when the contacts 84 are again closed.

If during the next cycle a bit is entered into the input stage 20 in the manner described above, the input bit is stored in the first stage 30, as represented by the closed contacts 33 and 34, the stage 40 is cleared, and the first entered bit is shifted into the stage 50. In this manner, data is entered into the shift register 10 through the input stage 20 and shifted through the stages 30, 40, 50, 60, and 70 from the lowest stage to the highest stage in the sequence. In addition, once the shift register 10 is loaded, operation of the shift signal generator 80 through successive cycles merely shifts the entry through the register.

The diodes, such as the diodes 37 and 47, included in the shift register stages prevent the discharge of the capacitors, such as the capacitors 35 and 45, into the capacitor charging line 14 when adjacent bits or "1" bits are shifted to the next highest stages during the shift cycle. The diodes, such as the diodes 36 and 46, isolate the various transfer or storage capacitors 35 and 45 in different stages from being charged through a single pair of closed contacts in a single stage during the interval in which the contacts 86 are open. In other words, the provision of the diodes 36 and 46, for instance, prevents both of the capacitors 35 and 45 from being charged through either of the closed contacts 24 or the closed contacts 34.

To provide means for resetting the shift register 10, a reset switch 90 is provided including the normally closed contacts 92 and a pair of normally open contacts 94. When the reset switch 90 is closed, the opening of the contacts 92 removes the positive potential from the conductors 12 and 14 and both terminates the energization of all of the holding windings, such as the windings 22, 32, and 42, and prevents the charging of capacitors over the conductor 14. The closure of the contacts 94 completes a circuit for discharging any charged capacitors in the various shift register stages and thus clears the shift register to a normal condition. The discharging of the capacitors during the period in which the reset switch is operated to close the contacts 94 does not result in the operation of the relays inasmuch as all of the holding windings are not energized, and it is thus impossible to have concurrent energization of both windings in any of the relays.

Although the present invention has been described with reference to a single illustrative embodiment thereof, it should be understood that numerous other modifications and embodiments can be devised by those skilled in the art that will fall within the spirit and scope of the principles of this invention.

What I claim and desire to be secured by Letters Patent of the United States is:

1. A shift register for storing and shifting the bits of a data entry comprising a plurality of shift register stages each including a pair of contacts and first and second windings, both of which windings must be concurrently energized to operate the contacts to store a bit and only one of which windings must be energized to hold the contacts operated, said stages being arranged in a sequence from lowest to highest, a potential source, first circuit means connecting the first winding in each stage across the potential source, a plurality of storage capacitors, second circuit means in each given stage and including the contacts of the next lowest stage in the sequence for connecting one of the storage capacitors across the potential source to charge the capacitor in accordance with the operated or released condition of the contacts in said next lowest stage, third circuit means for connecting the storage capacitor in each stage in series with the second winding in this stage to provide a path for discharging the capacitor through the second winding, and shift control means for periodically opening the first circuit means to release the contacts in all of the stages and for periodically closing the third circuit means to reoperate the contacts in the stages whose second windings are coupled to charged capacitors, thereby to transfer data through the register stages from the lowest to the highest.

2. A shift register for shifting stored bits of a data entry comprising a plurality of shift register stages arranged in a sequence from lowest to highest, each of said stages including a pair of contacts operated by the energization of first and second windings and held operated by the energization of only the first winding, a potential source, first circuit means normally connecting the first winding in each stage across the potential source to hold the contacts in a group of stages operated to represent the bits of a data entry, a plurality of storage capacitors, second circuit means in each given stage and including the contacts in the stage next lowest to the given stage in the sequence for connecting a capacitor to the potential source to charge the capacitor when the contacts in the next lowest stage are operated, third circuit means in each stage for connecting the capacitor in this stage across the second winding in this same stage to permit the capacitor to discharge through and energize the second winding, and shift control means for momentarily opening the first circuit means to release all of the contacts and for then momentarily closing the third circuit means to discharge the charged capacitors into the second windings so that certain of the second windings are momentarily energized concurrently with the first windings to operate the corresponding contacts and shift the data entry one stage upwardly in the sequence.

3. A shift register for storing and shifting bits of a data entry comprising a plurality of shift register stages arranged in a sequence from lowest to highest, each of said stages including relay means having first contacts closed by the concurrent energization of first and second windings and held closed by the energization of only the first winding, a potential source, first circuit means normally connecting the first windings in all of the stages to the potential source so that the first windings are normally energized to hold any closed contacts in the register in a closed condition, a plurality of storage capacitors, second circuit means in each stage for connecting the potential source to one of the capacitors to charge the capacitor, the second circuit for each of the stages except the lowest stage including the first contacts on the relay in the next lowest stage, a pair of input contacts operated to opened and closed conditions in accordance with data to be entered into the stage of the shift register, the input contacts being connected in the second circuit means for the lowest stage in the sequence so that the closure of the input contacts charges the capacitor for the lowest stage in the sequence, third circuit means for connecting the capacitor in each stage to the second winding in the same stage to discharge the capacitor through the connected second winding, and shift control means connected to the first and third circuit means for momentarily opening the first circuit means to release all of the relays and for then momentarily closing the third circuit means to discharge those of the capacitors that have been previously charged through the connected second windings to operate the relays in the corresponding stages by the concurrent energization of the first and second windings, the relays remaining operated after the discharge of the capacitor by virtue of the continuing energization of the first windings by the first circuit means.

4. The shift register set forth in claim 3 including means in the shift control means for disconnecting the second circuit means from the potential source during the momentary opening of the first circuit means and the momentary closing of the third circuit means.

5. The shift register set forth in claim 3 including diode means connected in series with each of the capacitors in the second circuit means and poled to permit a flow of current to the capacitor from the potential source.

6. The shift register set forth in claim 3 including diode means in the third circuit means connected in series with each of the second windings and poled to permit a flow of current through the second winding from the connected capacitor.

7. The shift register set forth in claim 3 including reset means including means for concurrently disconnecting the potential source from the first circuit means and closing the third circuit means.

8. The shift register set forth in claim 3 in which the input contacts are selectively opened and closed by an input relay having first and second windings both of which must be energized to close the input contacts and the first of which must be energized to hold the input contacts closed, the first winding being connected to the first circuit means and the second winding being adapted to be energized when a bit is to be stored.

9. A shift register for storing and shifting bits of a data entry comprising a plurality of shift register stages arranged in a sequence from lowest to highest, each of said stages including a relay having a pair of contacts closed by the concurrent energization of first and second windings and held closed by the energization of a first winding, a holding conductor common to all of the stages, a first circuit means in each stage connecting the first winding in the stage between the holding conductor and a point of reference potential.

a plurality of capacitors, a capacitor charging conductor, a second circuit means in each stage connecting one capacitor between the charging conductor and a point of reference potential, the second circuit for any given stage including the relay contacts of the next lowest stage in the sequence connected in series with the capacitor between the charging conductor and the point of reference potential, a transfer conductor common to all of the stages, a third circuit means in each stage connecting the second winding in the stage to the capacitor in the same stage and the transfer conductor, and shift control means including first means normally supplying a potential to the holding and charging conductors and operable to remove potential from these conductors and second means operable when the potential is removed from the charging conductor for connecting the transfer conductor to a point of reference potential.

10. A shift register as set forth in claim 9 including a data entry means including a pair of input contacts operable to opened and closed conditions, said input contacts being connected in the second circuit means in the lowest stage in the sequence in series with the capacitor in this second circuit means.